United States Patent [19]

Biera et al.

[11] Patent Number: 5,044,841
[45] Date of Patent: Sep. 3, 1991

[54] VALVE SEAT BUSHING MACHINING APPARATUS

[75] Inventors: Leonard W. Biera, Ortonville; William F. Crawford; John Kobane, Jr., both of Sterling Heights; Jack R. Settimo, Shelby Township, Macomb County, all of Mich.

[73] Assignee: Litton Industrial Automation Systems, Inc., Florence, Ky.

[21] Appl. No.: 556,648

[22] Filed: Jul. 20, 1990

[51] Int. Cl.$^5$ .............................................. B23B 41/06
[52] U.S. Cl. ........................................ 408/36; 82/1.4;
408/42; 408/118; 408/158; 409/233
[58] Field of Search ............... 408/36, 42, 117-119,
408/150, 153, 158, 83.5, 146, 147; 82/1.4;
409/231-234

[56] References Cited

U.S. PATENT DOCUMENTS 2,896,308 7/1959 Swords ........................... 408/118 X
4,692,074 9/1987 Smith et al. ...................... 408/36 X
4,789,280 12/1988 Dobat et al. ..................... 408/36 X Primary Examiner—Steven C. Bishop
Attorney, Agent, or Firm—Barnes, Kisselle, Raich, Choate, Whittemore & Hulbert

[57] ABSTRACT

Apparatus for machining a valve seat and valve stem guide all from the valve seat side of a head or block. The valve seat is machined in one pass by a single point cutting tool which is moved on two axes and, the valve guide bore is machined by a reamer. The movements of the single point cutting tool and reamer are numerically controlled.

4 Claims, 2 Drawing Sheets

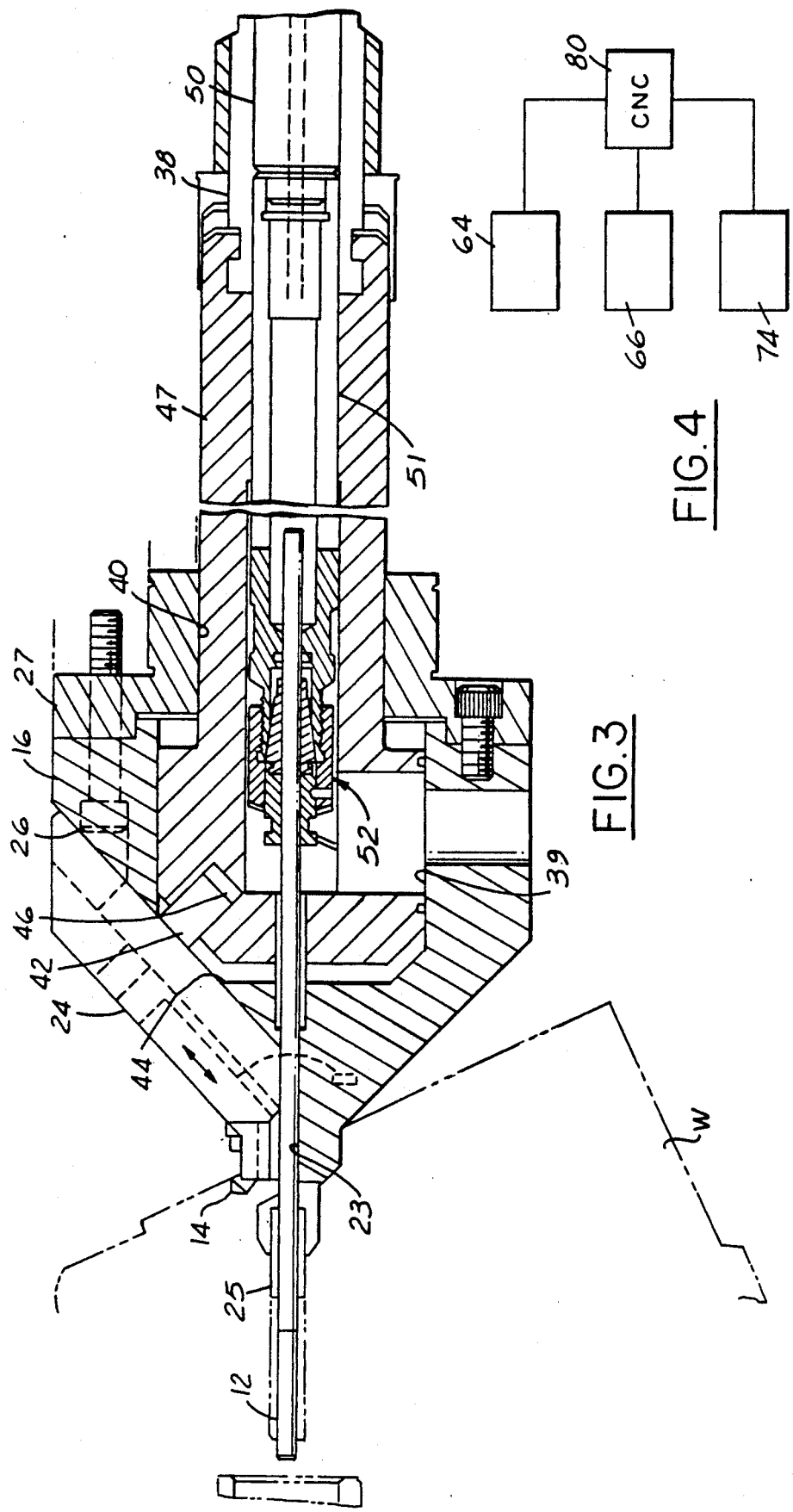

VALVE SEAT BUSHING MACHINING APPARATUS

FIELD OF THE INVENTION

This invention relates generally to valve assemblies of combustion engines and more particularly to an apparatus for machining engine valve seats and valve stem guides.

BACKGROUND OF THE INVENTION

In internal combustion engines, the intake and exhaust valves are typically mounted in the engine cylinder head or block. Usually, each valve has a stem slidably received in a valve guide bushing and a head which rests on and mates with a seat to provide a seal preventing fluid flow. Typically, both the valve seat and the guide bushing are either an integral part of a cast iron head or block or inserts of cast iron, sintered iron or the like, in a head or block of another material such as aluminum or magnesium. In mass producing modern engines, it is necessary that several adjoining surfaces of the valve seat be very accurately machined within extremely close tolerances having sharp and clean edges at the juncture of adjoining surfaces and that these surfaces be concentric with the bore in the associated valve guide or bushing. Many different machine tools, tool heads and approaches have been previously developed to machine these valve surfaces and their associated valve stem bore. Usually, the bore and valve seat surfaces are machined with separate tool heads, each utilizing piloted tools and requiring access to both sides of the head or block. Moreover, these prior approaches usually require two or three separate plunge cuts to machine the various surfaces of the valve seat. These prior approaches are relatively expensive to implement and have not consistently achieved the accuracy and reliability desired for modern mass production operations.

SUMMARY OF THE INVENTION

A tool head which both machines multiple surfaces of a valve seat and reams its associated valve guide bore all from the valve seat side of a head or block and without separately piloting the cutting tools. Preferably, multiple surfaces of the valve seat are machined in one pass by a single point cutting tool which is movable on two axes, before or after the valve guide bore is machined by a reamer or gun drill. Preferably, the movement of the single point cutting tool is numerically controlled.

Objects, features and advantages of this invention are to provide a tool head for machining valve seats and valve guides which finish machines both the multiple valve seat surfaces and the associated guide, machines a valve seat and guide without piloted tools, machines them from one side of the head or block, capable of machining a variety of seats, either intake or exhaust, of various size and seat angles within the feed stroke of the actuators and using the same tool head, accurately machines multiple valve seat surfaces in one pass, finish machines the valve seat surfaces and guide bore surfaces with greatly improved accuracy, concentricity and repeatability, is rugged, durable, of economical manufacture and assembly, simplified design and in use operates rapidly on a short cycle and is long in service useful life.

BRIEF DESCRIPTION OF THE DRAWINGS

These and other objects, features and advantages of this invention will be apparent from the following detailed description, appended claims and accompanying drawings in which:

FIG. 3 is an enlarged sectional view of the tool head in FIG. 1; and

FIG. 4 is a diagram showing the programmable numerical control (CNC) for various actuators.

DETAILED DESCRIPTION

Figure 1:
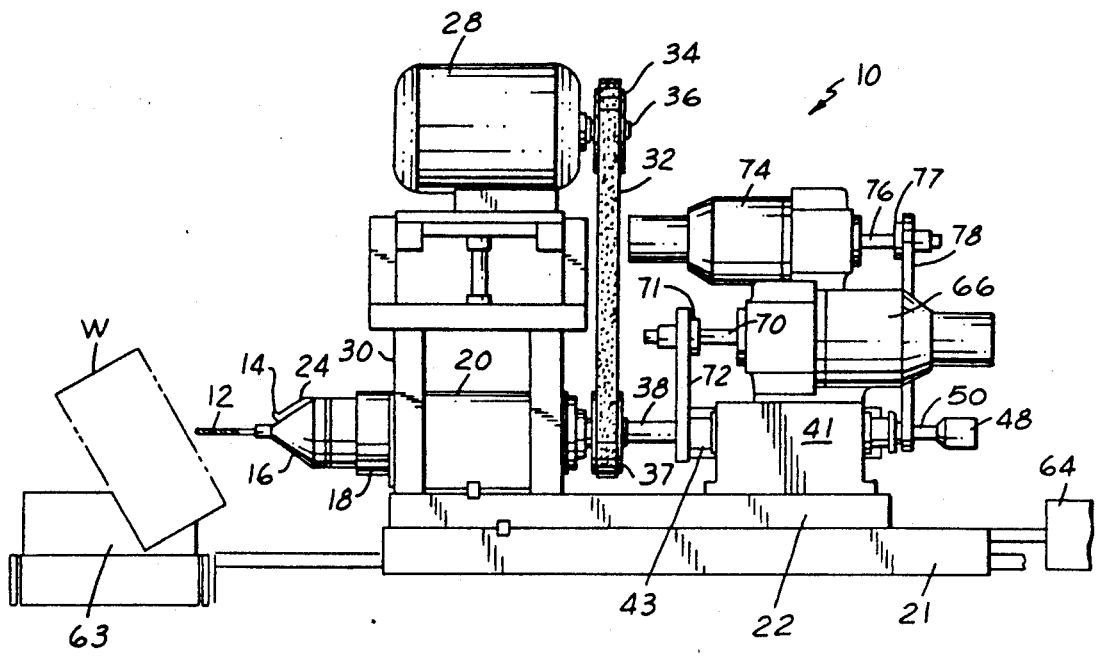
FIG. 1 is a fragmentary side view of a machine station with a tool head embodying this invention for finish machining multiple surfaces of a valve seat and its associated guide.

As shown in the drawings, the machining apparatus 10 has a gun reamer 12 and a single point tool 14 carried by a tool head 16. The tool head 16 is piloted by and bolted to an adapter 27 which is rigidly mounted on a spindle 18. Spindle 18 rotates in a housing 20 mounted on a sub-plate 22. Sub-plate 22 is mounted on a precision slide unit 21 for reciprocation in directions parallel to the axis of rotation of spindle 18.

The gun reamer 12 is axially, slidably received in a passage 23 and guide bushing 25 in the tool head 16 and projects outwardly from the tool head in alignment with the rotational axis of spindle 18. The single point tool 14 is mounted on a tool slide 24. Slide 24 is mounted in a groove 26 in the tool head 16 for sliding movement such that tool 14 moves on a line which intersects the rotational axis of spindle 18 usually at an acute angle of 45° to 90° to the axis. Thus the single point tool 14 is laterally or generally radially adjustably mounted on the tool head.

A spindle drive motor 28 is mounted on a frame 30 which is attached to the sub-plate 22. To rotate the spindle 18 by motor 28, a belt 32 extends over a sheave 34 on the motor output shaft 36 and over a sheave 37 on spindle 18.

An outer control bar 38 for the single point tool 14 is attached to a tool actuator bar 47 which is slidably received in a blind bore 39 in tool head 16 and through bore 40 in adapter 27 concentric with the rotational axis of the spindle. The control bar 38 runs inside a quill shaft 43 for longitudinal movement in a housing 41 mounted on sub-plate 22. A cylindrical cam pin 42 projects from the underside of the tool slide 24 through an elongated slot 44 in the bottom of groove 26 at right angles to groove 26 and on a line which intersects the rotational axis of spindle 18. Cam pin 42 is slidably received in a cylindrical socket 46 in actuator bar 47 so that longitudinal movement of the outer control bar 38 effects movement of tool slide 24 in groove 26 and corresponding movement to the single point tool 14.

An inner control bar 50 for the reamer 12 extends through outer bar 38 and is connected to collet chuck assembly 52 which is axially slidably received in through bore 51 in actuator bar 47. The gun reamer 12 is held by chuck 52 whereby gun reamer 12 can be extended and retracted by longitudinal movement of the inner control bar 50. A coolant union 48 is connected to the inner control bar 50 to furnish coolant through the gun reamer 12 during the machining operation.

The slide unit 21 is reciprocated by an actuator 64 preferably in the form of a servo controlled precision ball screw drive to control the depth of cut of the tool head 16 and longitudinal movement (preferably rapid stroke) of the gun reamer 12 along the "Z" axis.

The outer control bar 38 is driven by an actuator 66 mounted on housing 41. Actuator 66 has a ball screw drive 70. A nut 71 on the ball screw drive is connected to the quill shaft 43 by an arm or cross connecter 72 to reciprocate the outer control bar in response to operation of the ball screw drive. This movement of bar 38 controls lateral movement of the single point tool 14 along the "X" axis during feed and retract strokes.

The inner control bar 50 is driven by an actuator 74 mounted on housing 41. Actuator 74 has a ball screw drive 76. A nut 77 on the ball screw drive is connected to the inner control bar 50 by an arm or cross connecter 78 to reciprocate the inner control bar and the reamer 12 along the "Z" axis during feed and retract strokes in response to operation of the ball screw drive.

The servo controlled ball screw drives 64, 66 and 74 may be operated independently of one another or may be synchronized and controlled by a programmable computer numerical control (CNC) system 80.

Figure 2:
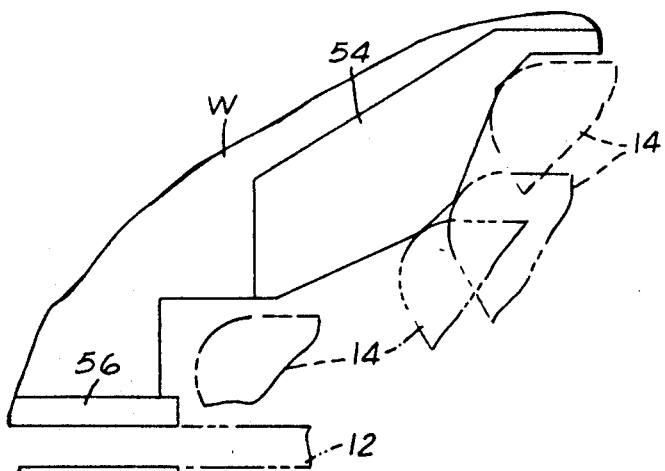
FIG. 2 is an enlarged sectional view of an engine cylinder head with a valve seat and associated guide bushing finish machined by the tool head and machine of FIG. 1.
Figure 2:
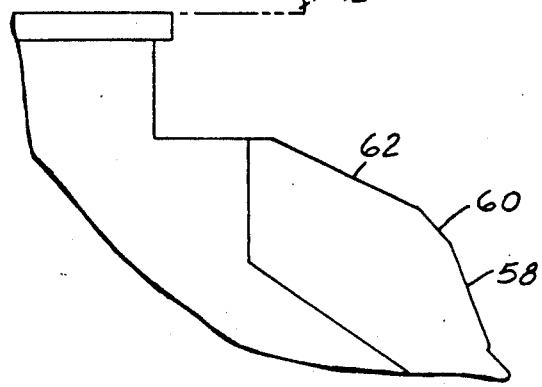

FIG. 2 shows in enlarged section a portion of a workpiece W such as an engine cylinder head having a valve seat 54 and an associated valve stem guide 56. The valve seat is shown as having three contiguous frusto-conical surfaces 58, 60 and 62 which are adapted to mate with the head of a valve (not shown) to prevent fluid flow. The valve stem guide is a cylindrical bore which is centered or concentric with respect to the surfaces 58, 60 and 62 of the valve seat and adapted to slidably receive and guide the stem of a valve. The workpiece W is mounted on a fixture 63 with the valve stem guide 56 aligned with the reamer 12 and concentric with spindle 18.

In use, the machining apparatus 10 performs two machining sequences which may be performed in any order.

In one sequence in which the valve stem guide or bore 56 is machined, the workpiece W is mounted on the fixture 63 in a position such that the valve stem guide or bore 56 is aligned with reamer 12. The actuator 64 advances precision slide unit 21 from a start position to a predetermined position in relationship to workpiece W. The actuator 74 feeds inner control bar 50 which in turn feeds gun reamer 12 into the workpiece to machine valve stem guide 56. Actuator 74 then rapidly retracts inner control bar 50 which retracts gun reamer 12.

In the next sequence in which the valve seat surfaces 58, 60 and 62 are machined, and with precision slide unit 21 still in the same position as in the first sequence, actuators 64 and 66 are controlled and operated simultaneously by the CNC System 80 to advance precision slide unit 21 and outer control bar 38, which results in movement of tool slide 24 by virtue of the engagement between cam pin 42 and socket 46 in the head 16, to cut valve seat surfaces 58, 60 and 62. Actuator 64 and actuator 66 are operated to rapidly retract first the slide unit 21 and then control bar 38 to their start positions. Once precision slide unit 21 and tool slide 24 are back to their start positions, precision slide unit 21 is rapidly moved back to its home position, ready to cut another valve seat and guide. It should be noted that any contour of stem bore and valve seat may be machined using the simultanously controlled precision slide unit 21 and tool slide 24, as long as it is within the range of the feed strokes of the apparatus.

These machining sequences may be carried out in reverse order, if desired.

What is claimed is:

1. Apparatus for machining an annular valve seat and associated concentric valve stem guide of a workpiece, comprising a support for the workpiece, a tool head, means supporting said tool head adjacent said workpiece support for rotation on an axis aligned with the valve stem guide of the supported workpiece and for axial movement toward and away from the supported workpiece, first power means for rotating said tool head about its axis of rotation, a reamer mounted on said tool head coaxially with the axis of rotation of said tool head for reaming said valve stem guide, a tool slide, a cutting tool mounted on said tool slide, guide means mounting said tool slide on said tool head for movement of said cutting tool along a line which intersects said axis of rotation, second power means operative to axially move said tool head, third power means operative to move said tool slide along said guide means, and control means for coordinating the operation of said second and third power means to cause said cutting tool to follow a predetermined path suitable for the machining of said valve seat.

2. Apparatus as defined in claim 1, including fourth power means for axially moving said reamer during reaming of said valve stem guide.

3. Apparatus as defined in claim 2, wherein said third power means includes a first control bar mounted on said tool head for longitudinal sliding movement and operatively connected to said tool slide, and said fourth power means includes a second control mounted on said tool head for longitudinal sliding movement and operatively connected to said reamer, said first and second control bars being movable independently of one another.

4. Apparatus as defined in claim 3, wherein said first control bar is tubular and extends along the axis of rotation of said tool head, and said second control bar extends coaxially within said first control bar.

* * * * *